US009642116B2

(12) United States Patent
Shang et al.

(10) Patent No.: US 9,642,116 B2
(45) Date of Patent: May 2, 2017

(54) DYNAMIC MBSFN AREA CONFIGURATION METHOD IN CONSIDERATION OF RADIO RESOURCE EFFICIENCY AND SYSTEM THEREOF

(75) Inventors: Dan Shang, Shanghai (CN); Qi Zhou, Shanghai (CN)

(73) Assignee: NXP B.V., Eindhoven (NL)

( * ) Notice: Subject to any disclaimer, the term of this patent is extended or adjusted under 35 U.S.C. 154(b) by 1645 days.

(21) Appl. No.: 12/920,788

(22) PCT Filed: Mar. 5, 2009

(86) PCT No.: PCT/IB2009/050917
§ 371 (c)(1),
(2), (4) Date: Sep. 2, 2010

(87) PCT Pub. No.: WO2009/109937
PCT Pub. Date: Sep. 11, 2009

(65) Prior Publication Data
US 2011/0007668 A1   Jan. 13, 2011

Related U.S. Application Data

(60) Provisional application No. 61/068,350, filed on Mar. 5, 2008.

(51) Int. Cl.
*H04W 72/00* (2009.01)
*H04W 16/10* (2009.01)
(Continued)

(52) U.S. Cl.
CPC ......... *H04W 72/005* (2013.01); *H04W 24/08* (2013.01); *H04W 24/10* (2013.01); *H04W 16/10* (2013.01)

(58) Field of Classification Search
CPC ........................ H04W 16/10; H04W 72/005
See application file for complete search history.

(56) References Cited

U.S. PATENT DOCUMENTS 6,882,846 B1 * 4/2005 O'Byrne ................ 455/447
8,223,689 B2 * 7/2012 Fischer ................. 370/328
(Continued)

FOREIGN PATENT DOCUMENTS

EP      1784031 A1    5/2007
WO   2008/058149 A    5/2008

OTHER PUBLICATIONS

Qualcomm Europe; "3GPP TSG RAN WG2—Resource Demands of Overlapping MBSFN Areas"; R2-074671, Nov. 2007.*
(Continued)

*Primary Examiner* — Alpus H Hsu
*Assistant Examiner* — Hooman Houshmand

(57) ABSTRACT

A method and system determines an absolute Multicast-Broadcast Single Frequency Network (MBSFN) configuration based on a threshold. First saved radio resources and first wasted radio resources are calculated. The absolute MBSFN configuration is set as the final MBSFN configuration when the first saved radio resources are greater than or equal to the first wasted radio resources. When untrue, the absolute MBSFN configuration plus an adjacent cell pool is set as the final MBSFN configuration based on the final MBSFN configuration achieving a maximum value of second saved radio resources minus second wasted radio resources. When both of these conditions are untrue, the absolute MBSFN configuration minus an MBSFN cell pool is set as the final MBSFN configuration based on the final MBSFN configuration achieving a maximum value of third saved radio resources minus third wasted radio resources.

19 Claims, 3 Drawing Sheets

(51) Int. Cl.
*H04W 24/08* (2009.01)
*H04W 24/10* (2009.01)

(56) References Cited

U.S. PATENT DOCUMENTS

| | | | |
|---|---|---|---|
| 2005/0111395 A1* | 5/2005 | Hwang et al. | 370/313 |
| 2008/0101270 A1* | 5/2008 | Kekki et al. | 370/312 |
| 2008/0232395 A1* | 9/2008 | Buckley et al. | 370/465 |
| 2008/0232396 A1* | 9/2008 | Buckley et al. | 370/465 |
| 2008/0267109 A1* | 10/2008 | Wang et al. | 370/312 |
| 2008/0274759 A1* | 11/2008 | Chen | H04W 72/005 455/507 |
| 2008/0287129 A1* | 11/2008 | Somasundaram et al. | 455/436 |
| 2010/0056166 A1* | 3/2010 | Tenny | 455/450 |
| 2010/0165953 A1* | 7/2010 | Chen et al. | 370/335 |
| 2010/0323737 A1* | 12/2010 | Koo et al. | 455/509 |
| 2010/0329150 A1* | 12/2010 | Nielsen | 370/254 |
| 2011/0021224 A1* | 1/2011 | Koskinen et al. | 455/507 |

OTHER PUBLICATIONS

Wang, Chun-Yen, et al; "Reference Model and Protocol Architecture for Supporting E-MBS in IEEE 802.16M"; IEEE; (Nov. 14, 2007).
Panasonic; "3GGP TSG RAN WG3—Optimization of Dynamic SFN"; R3-061470 (Oct. 2006).
Qualcomm Europe; "3GGP TSG RAN WG2—SFN Operation in E-MBMS Channel Structure"; R2-061853 (Jun. 2006).
Motorola; "3GPP TSG RAN WG2—SFN Areas and the MBS Coordinating /Function"; R2-062155 (Sep. 2006).
Nokia; "3GPP TSG RAN WG2—MBMS Definitions"; R2-070013 (Jan. 2007).
Motorola; "3GPP TSG RAN WG2—Over-Provisioning Required to Accommodate Overlapping"; R2-071435 (Mar. 2007).
Motorola; "3GPP TSG RAN WG2—Additional Results on Over-Provisioning Required to Accommodate Overlapping SFN Areas"; R2-072593 (Jun. 2007).
Motorola; "3GPP TSG RAN WG2—Handling Mobility of UEs in MBSFN Mode"; R2-074649 and R2-074410 (Nov. 2007).
Motorola; "3GPP TSG RAN WG2—Considerations on Cell Addition Mechanisms for Dynamic SFN"; R2-74650 and R2-074411 (Nov. 2007).
Qualcomm Europe; "3GPP TSG RAN WG2—Resource Demands of Overlapping MBSFN Areas"; R2-074671 (Nov. 2007).
Ericsson; "3GPP TSG RAN WG2—MBMS Service Continuity"; R2-074710 (Nov. 2007).
Nokia Corporation/Nokia Siemens Networks; "3GPP TSG RAN WG2—on Supporting Dynamic MBSFNs and Transmission Mode Switching in MBMS"; R2-074849 and R2-073981 (Nov. 2007).
Ericsson; "3GPP TSG RAN WG3—SFN Area Configuration for E-MBMS"; R3-061505 (Oct. 2006).
Mitsubishi Electric; "3GPP TSG RAN WG3—Dynamic SFN Area and RRM Management"; R3-061511 (Oct. 2006).
Catt; "3GPP TSG RAN WG3—Consideration About SFN Management"; R3-070217 (Feb. 2007).
International Search Report for Application PCT/IB2009/050917 (Mar. 5, 2009).
Nokia/Nokia Siemens Networks; "3GPP TSG RAN WG2—On MBMS Service Continuity"; R2-074853 (Nov. 2007).

* cited by examiner

DYNAMIC MBSFN AREA CONFIGURATION METHOD IN CONSIDERATION OF RADIO RESOURCE EFFICIENCY AND SYSTEM THEREOF

The present invention relates to dynamic Multicast/Broadcast Single Frequency Network (MBSFN) configuration method in consideration of radio resource efficiency and system thereof.

The Third Generation Partnership Project (3GPP) Long-term Evolution (LTE) standardization has raised and regarded MBSFN as a very important topic for Multimedia Broadcast Multicast Service (MBMS).

In the MBMS system structure, a Multi-cell MBMS Synchronization Area consists of a group of cells having the same frequency band allocated with contiguous coverage, in which all the cells are able to be synchronized and have the capability of transmitting MBMS data in a single-frequency network (SFN) mode. Multi-cell MBMS Synchronization Areas may be configured independently from MBMS Service Area configurations.

Multi-cell MBMS Synchronization Areas may also be configured to support more than one SFN Area. An SFN area is a group of cells with contiguous coverage where all cells use the same radio resources in the same frequency band to synchronously transmit a single MBMS service. An SFN area belongs only to one Multi-cell MBMS synchronization area and is composed only of actively transmitting cells at a certain point in time. In between the SFN Areas are SFN Guard Areas, which are groups of cells where due to the resource usage in corresponding SFN Areas, the use of the same radio resources is restricted due to interference considerations.

For a given geographical area and frequency band, only one Multi-cell MBMS Synchronization Area may be defined. Accordingly, more than one Multi-cell MBMS Synchronization Area in the same geographical area must be defined on different frequency bands.

There exist several scenarios where multiple MBSFN areas overlap. FIG. 1 is a diagram illustrating the radio resource scheduling of overlapping transmissions. The diagram includes an MBSFN Area A 102, a Guard Area A 104, an Overlap Area 106, a Guard Area B 108 and an MBSFN Area B 110. Services from two local areas overlap in the center, indicated by the Overlap Area 106. Four sets of radio resources are available, as well as a variety of other services, including unicast transmission ("U") and idled resources ("x"). In FIG. 1, service 1 from the MBSFN Area A and service 4' from the MBSFN Area B are offered in the Overlap Area 106, services 2 and 4 are strictly local to the MBSFN Area A and service 1' is strictly local to the MBSFN Area B. The other resources are used for unicast transmission or other uses (e.g., cell-specific services) in all of the areas. However, the resources in the Guard Area A 104 and the Guard Area B 108 cannot be used for any services while two neighboring MBSFN areas transmit different services with the same resource.

Existing literature describes changes in MBSFN areas due to User Equipment (UE) movement as a threshold for MBSFN configuration. In these configurations, the network will count the number of users for every possible service. If more users require using a certain service in a cell, this cell may be added to an MBSFN. Correspondingly, if less users require using a certain service in a cell, this cell may be removed from an MBSFN. Cells joining together may generate a new MBSFN, whereas cells leaving an existing MBSFN may make the MBSFN disappear.

Existing literature also describes using Signal-to-Interference plus Noise-Ratio (SINR) as a threshold for MBSFN configuration.

MBSFN systems utilize macro diversity to improve network efficiency. MBSFN systems transmit identical, time-synchronized signals to all cells in a specified area. User Equipment (UE) at the edges of the cells receive combined signals from an overlap between the identical, time-synchronized signals at the edges of the cells. Accordingly, the UEs at the edges of the cells receive improved signal quality through macro diversity gain. However, due to limited radio resources, all of the possible services cannot be accommodated by only one MBSFN area, and this may lead to MBSFN overlapping. To mitigate interference caused by the overlap among adjacent MBSFN areas, some radio resources, such as in guard areas, must be set to idle and therefore, are wasted.

In exemplary embodiments of the present disclosure is provided one dynamic MBSFN configuration method in consideration of radio resource efficiency and system thereof. The dynamic MBSFN configuration method and system efficiently manages saved radio resources while reducing or eliminating wasted radio resources. Accordingly, cell parameters such as number of users added or removed from an absolute MBSFN configuration and the number of idle guard radio resources added or removed from an old MBSFN area are efficiently managed.

In one exemplary embodiment according to the present invention, there is provided a method of dynamic MBSFN configuration in consideration of radio resource efficiency, wherein the method determines an absolute MBSFN configuration, the absolute MBSFN configuration defining a number of users in a new MBSFN area and a number of idle guard radio resources in an old MBSFN area, calculates first saved radio resources by multiplying the number of users in the new MBSFN area by a first weight factor, calculates first wasted radio resources by multiplying the number of idle guard radio resources in the old MBSFN area by a second weight factor, and sets the absolute MBSFN configuration as a final MBSFN configuration when the first saved radio resources are greater than or equal to the first wasted radio resources.

The absolute MBSFN configuration may be determined utilizing at least one of a number of users or a Signal-to-Interference Noise-Ratio (SINR).

The second weight factor may be calculated by multiplying a number of potential users in the idle guard radio resources in the old MBSFN area by a wasted radio resource weight factor.

The first weight factor may be substantially equal to the wasted radio resource weight factor. The absolute MBSFN configuration may further define upper and lower thresholds of cell pool parameters.

The cell pool parameters may include at least one of a number of users and a Signal-to-Interference Noise-Ratio (SINR).

The method may further select all cell pools adjacent to the new MBSFN area in which cell pool parameters of the adjacent cell pools exceed the lower threshold of cell pool parameters when the first saved radio resources are less than the first wasted radio resources, select an adjacent cell pool from the adjacent cell pools such that second saved resources subtracted by second wasted resources achieves a maximum value when the adjacent cell pool is added to the absolute MBSFN configuration, wherein the second saved resources are calculated by adding the number of users in the new MBSFN area to a number of new users in cells of the adjacent cell pool and multiplying by a third weight factor, and the second wasted resources are calculated by adding the number of idle guard radio resources in the old MBSFN area to a number of idle guard radio resources in the cells of the adjacent cell pool and multiplying by a fourth weight factor, and setting the cells of the adjacent cell pool and the absolute MBSFN configuration as the final MBSFN configuration.

The first weight factor may be substantially equal to the third weight factor.

The second weight factor may be substantially equal to the fourth weight factor.

The method may further select all MBSFN cell pools within the new MBSFN area in which cell pool parameters of the MBSFN cell pools are below the upper threshold of cell pool parameters when the cell pool parameters of the adjacent cell pools are below the lower threshold of cell pool parameters or when none of the adjacent cell pools are such that the second saved radio resources are less than the second wasted radio resources, select an MBSFN cell pool from the MBSFN cell pools such that third saved resources subtracted by third wasted resources achieves a maximum value when the MBSFN cell pool is removed from the absolute MBSFN configuration, wherein the third saved resources are calculated by subtracting the number of users in the new MBSFN area by a number of users in cells of the MBSFN cell pool and multiplying by a fifth weight factor, and the third wasted resources are calculated by subtracting the number of idle guard radio resources in the new MBSFN area by a number of idle guard radio resources in the cells of the MBSFN cell pool and multiplying by a sixth weight factor, and set the cells of the absolute MBSFN configuration minus the cells of the MBSFN cell pool as the final MBSFN configuration. The first weight factor may be substantially equal to each of the third weight factor and the fifth weight factor.

The second weight factor may be substantially equal to each of the fourth weight factor and the sixth weight factor.

In another aspect according to an exemplary embodiment of the present invention, there is provided a dynamic MBSFN area configuration system for comparing saved radio resources with wasted radio resources to set a final MBSFN configuration, wherein the system includes a core network for receiving data from multiple data sources, multiple radio network subsystems coupled to the core network, each of the radio network subsystems comprising multiple radio network controllers coupled to multiple base stations, the multiple base stations defining cells, wherein contiguous cells are grouped together to comprise an MBSFN area, a number of user equipments (UEs) configured to receive MBSFN signals from the cells, and an MBSFN configuration module for defining an absolute MBSFN configuration, the absolute MBSFN configuration defining a number of UEs in a new MBSFN area, a number of added idle guard radio resources in an old MBSFN area and an upper and lower threshold of cell pool parameters.

The MBSFN configuration module may be configured to calculate first saved radio resources among the saved radio resources by multiplying a first weight factor by the number of UEs in the new MBSFN area, calculate first wasted radio resources among the wasted radio resources by multiplying a second weight factor by the number of idle guard radio resources added to the old MBSFN area, and set the absolute MBSFN configuration as the final MBSFN configuration when the first saved radio resources are greater than or equal to the first wasted radio resources.

The absolute MBSFN configuration may be determined utilizing at least one of a number of users or a Signal-to-Interference Noise-Ratio (SINR).

The second weight factor may be calculated by multiplying a number of potential users in the idle guard radio resources in the old MBSFN area by a wasted radio resource weight factor.

The first weight factor may be substantially equal to the wasted radio resource weight factor.

The MBSFN configuration module may be further configured to select all cell pools adjacent to the new MBSFN area in which cell pool parameters of the adjacent cell pools exceed the lower threshold of cell pool parameters when the first saved radio resources are less than the first wasted radio resources, select an adjacent cell pool from the adjacent cell pools such that second saved radio resources among the saved radio resources subtracted by second wasted radio resources among the wasted radio resources achieves a maximum value when the adjacent cell pool is added to the absolute MBSFN configuration, wherein the second saved radio resources are calculated by adding the number of UEs in the new MBSFN area to a number of new UEs in cells of the adjacent cell pool and multiplying by a third weight factor, and the second wasted radio resources are calculated by adding the number of idle guard radio resources in the old MBSFN area to a number of idle guard radio resources in the cells of the adjacent cell pool and multiplying by a fourth weight factor, and set the cells of the adjacent cell pool and the absolute MBSFN configuration as the final MBSFN configuration.

The first weight factor may be substantially equal to the third weight factor.

The second weight factor may be substantially equal to the fourth weight factor.

The MBSFN configuration module may be further configured to select all MBSFN cell pools within the new MBSFN area in which cell pool parameters of the MBSFN cell pools are below the upper threshold of cell pool parameters when the cell pool parameters of the adjacent cell pools are below the lower threshold of cell pool parameters or when none of the adjacent cell pools are such that the second saved radio resources are less than the second wasted radio resources, select an MBSFN cell pool from the MBSFN cell pools such that third saved radio resources among the saved radio resources subtracted by third wasted radio resources among the wasted radio resources achieves a maximum value when the MBSFN cell pool is removed from the absolute MBSFN configuration, wherein the third saved radio resources are calculated by subtracting the number of UEs in the new MBSFN area by a number of UEs in cells of the MBSFN cell pool and multiplying by a fifth weight factor, and the third wasted radio resources are calculated by subtracting the number of idle guard radio resources in the new MBSFN area by a number of idle guard radio resources in the cells of the MBSFN cell pool and multiplying by a sixth weight factor, and set the cells of the absolute MBSFN configuration minus the cells of the MBSFN cell pool as the final MBSFN configuration.

The first weight factor may be substantially equal to each of the third weight factor and the fifth weight factor.

The second weight factor may be substantially equal to each of the fourth weight factor and the sixth weight factor.

In the following detailed description, only certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature, and not restrictive.

In exemplary embodiments according to the present invention, one dynamic MBSFN area configuration method in consideration of radio resource efficiency and system thereof is presented. The dynamic MBSFN configuration method and system efficiently manages saved radio resources while reducing or eliminating wasted radio resources. Accordingly, cell parameters such as number of users added or removed from an absolute MBSFN configuration and the number of idle guard radio resources added or removed from an old MBSFN area are efficiently managed.

Figure 1:
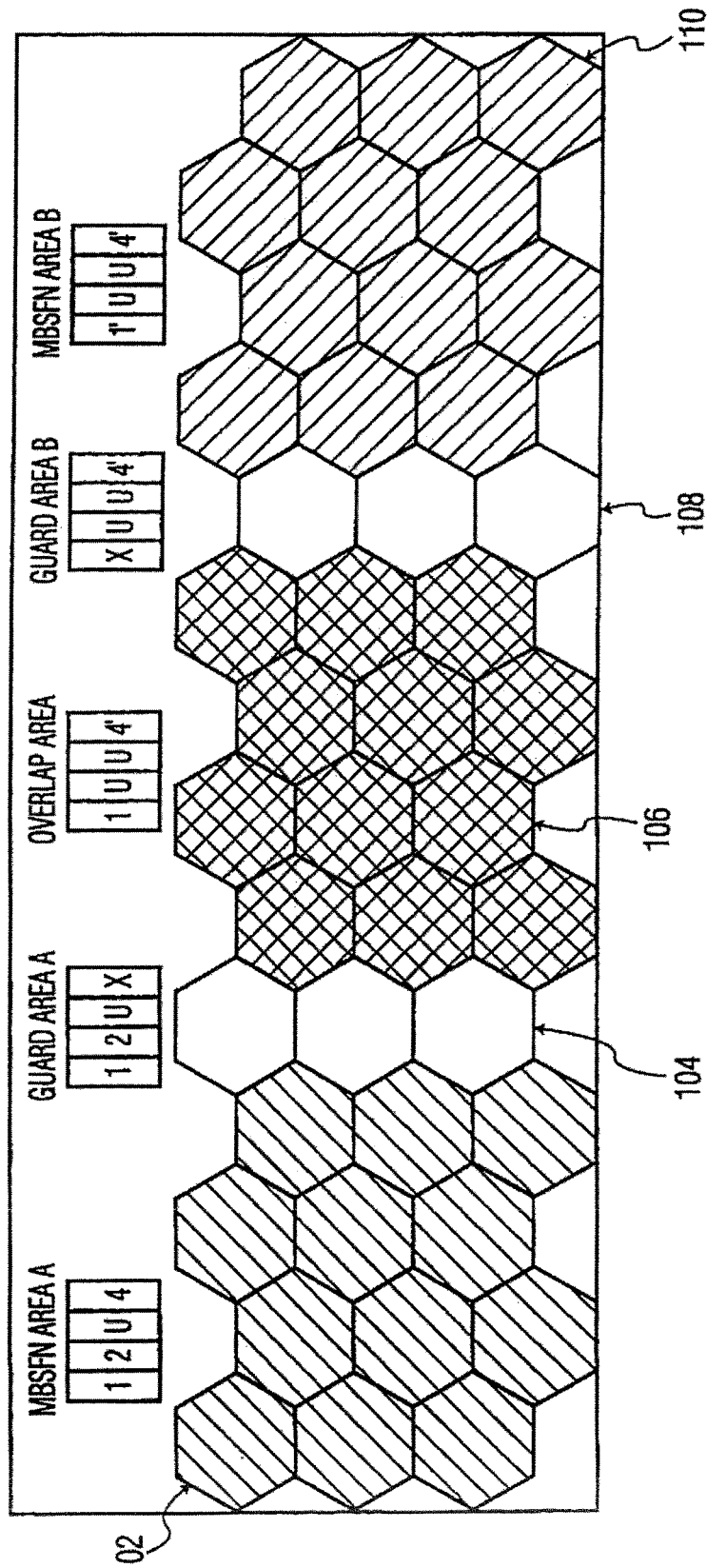
FIG. 1 is a diagram illustrating the radio resource scheduling of overlapping transmissions.
Figure 2:
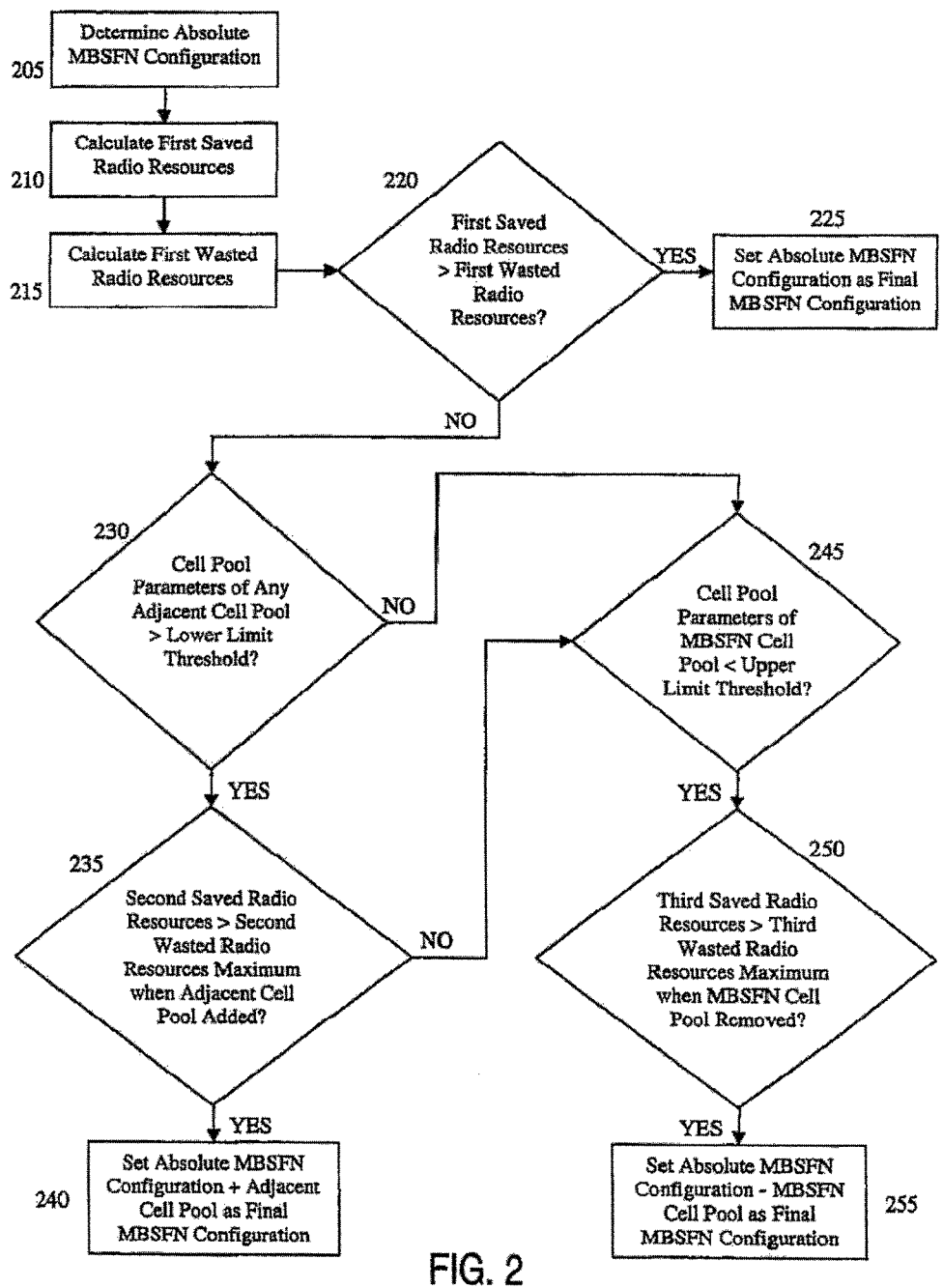
FIG. 2 is a flow diagram illustrating an exemplary one dynamic MBSFN configuration method in consideration of radio resource efficiency in accordance with an embodiment of the present invention.

FIG. 2 is a flow diagram illustrating an exemplary one dynamic MBSFN configuration method in consideration of radio resource efficiency in accordance with an embodiment of the present invention.

At block 205, an absolute MBSFN configuration is determined. The absolute MBSFN configuration is determined when there is a variation in the number of users that require a certain kind of service. Once the number of users that require a certain kind of service reaches a threshold, a new absolute MBSFN configuration is defined. The absolute MBSFN configuration threshold may include a number of users in a new MBSFN area, a number of idle guard radio resources added in an old MBSFN area, upper and lower thresholds of cell pool parameters, the SINR and other parameters. One of ordinary skill in the art would recognize that the threshold is a system design parameter that depends on the requirements of the overall system.

At block 210, first saved radio resources are calculated. The first saved radio resources are calculated by multiplying a first weight factor by the number of users in the new MBSFN area. The equation $\alpha \cdot n$ defines this calculation, where $\alpha$ is the weight factor of the saved radio resources and n is the number of users in the new MBSFN area. The first weight factor $\alpha$ is a system design parameter that may be varied depending on the system's requirements.

At block 215, first wasted radio resources are calculated. The first wasted radio resources are calculated by multiplying a second weight factor by the number of idle guard radio resources in the old MBSFN area. The equation $\beta \cdot m$ defines this calculation, where $\beta$ is the weight factor of the wasted radio resources and m is the number of idle guard radio resources in the old MBSFN area. The second weight factor $\beta$ is a system design parameter that may be varied depending on the system's requirements. The second weight factor may be calculated by multiplying a number of potential users in the idle guard radio resources in the old MBSFN area by a wasted radio resource weight factor. The first weight factor may be substantially equal to the wasted radio resource weight factor.

At block 220, the first saved radio resources are compared with the first wasted radio resources. The equation $\alpha \cdot n \geq \beta \cdot m$ defines this comparison, where a $\alpha \cdot n$ is the first saved resources and $\beta \cdot m$ is the first wasted resources. At step 225, the absolute MBSFN configuration is set as the final MBSFN configuration when the first saved radio resources are greater than or equal to the first wasted radio resources.

At block 230, cell pool parameters of any adjacent cell pools are compared with the lower limit threshold of cell parameters when the first saved radio resources are less than the first wasted radio resources. All cell pools adjacent to the new MBSFN area in which cell pool parameters of the adjacent cell pools exceed the lower threshold of cell pool parameters are selected.

At block 235, an adjacent cell pool is selected from the adjacent cell pools when second saved resources minus second wasted resources achieves a maximum value when the adjacent cell pool is added to the absolute MBSFN configuration. In other words, the adjacent cell pool selected from the adjacent cell pools results in the maximum value of $\alpha' \cdot n - \beta' \cdot m \geq 0$, where $\alpha' \cdot n$ is the second saved resources and $\beta' \cdot m$ is the second wasted resources. The second saved resources are calculated by adding the number of users in the new MBSFN area to a number of new users in cells of the adjacent cell pool and multiplying this sum by a third weight factor $\alpha'$. The second wasted resources are calculated by adding the number idle guard radio resources in the old MBSFN area to a number of idle guard radio resources in the cells of the adjacent cell pool and multiplying by a fourth weight factor $\beta'$. In the $\alpha' \cdot n - \beta' \cdot m \geq 0$ equation, $\alpha'$ is the weight factor of the saved radio resources (e.g., the third weight factor $\alpha'$) and n is the number of users in the new MBSFN area, and $\beta'$ is the weight factor of the wasted radio resources (e.g., the fourth weight factor $\beta'$) and m is the number of idle guard radio resources in the old MBSFN area.

At block 240, the cells of the adjacent cell pool plus the absolute MBSFN configuration is set as the final MBSFN configuration.

At block 245, cell pool parameters of any MBSFN cell pools are compared with the upper limit threshold of cell parameters when the cell pool parameters of the adjacent cell pools are below the lower threshold of cell pool parameters or when none of the adjacent cell pools are such that the second saved radio resources $\alpha' \cdot n$ are less than the second wasted radio resources $\beta' \cdot m$. All MBSFN cell pools within the new MBSFN area that are below the upper threshold of cell parameters are selected.

At block 250, an MBSFN cell pool is selected from the MBSFN cell pools when third saved resources minus third wasted resources achieves a maximum value when the MBSFN cell pool is removed from the absolute MBSFN configuration. In other words, the MBSFN cell pool selected from the MBSFN cell pools that is removed from the absolute MBSFN configuration results in the maximum value of $\alpha'' \cdot n - \beta'' \cdot m \geq 0$, where $\alpha'' \cdot n$ is the third saved resources and $\beta' \cdot m$ is the third wasted resources. The third saved resources are calculated by subtracting the number of users in the new MBSFN area by a number of new users in cells of the MBSFN cell pool and multiplying this sum by a fifth weight factor $\alpha''$. The third wasted resources are calculated by subtracting the number idle guard radio resources in the new MBSFN area by a number of idle guard radio resources in the cells of the MBSFN cell pool and multiplying by a sixth weight factor $\beta''$. In the $\alpha'' \cdot n - \beta'' \cdot m \geq 0$ equation, $\alpha''$ is the weight factor of the saved radio resources (e.g., the fifth weight factor $\alpha''$) and n is the number of users in the new MBSFN area minus a number of new users in cells of the MBSFN cell pool, and $\beta''$ is the weight factor of the wasted radio resources (e.g., the sixth weight factor β") and m is the number idle guard radio resources in the new MBSFN area by a number of idle guard radio resources in the cells of the MBSFN cell pool.

At block 255, the absolute MBSFN configuration minus the cells of the MBSFN cell pool is set as the final MBSFN configuration.

Figure 3:
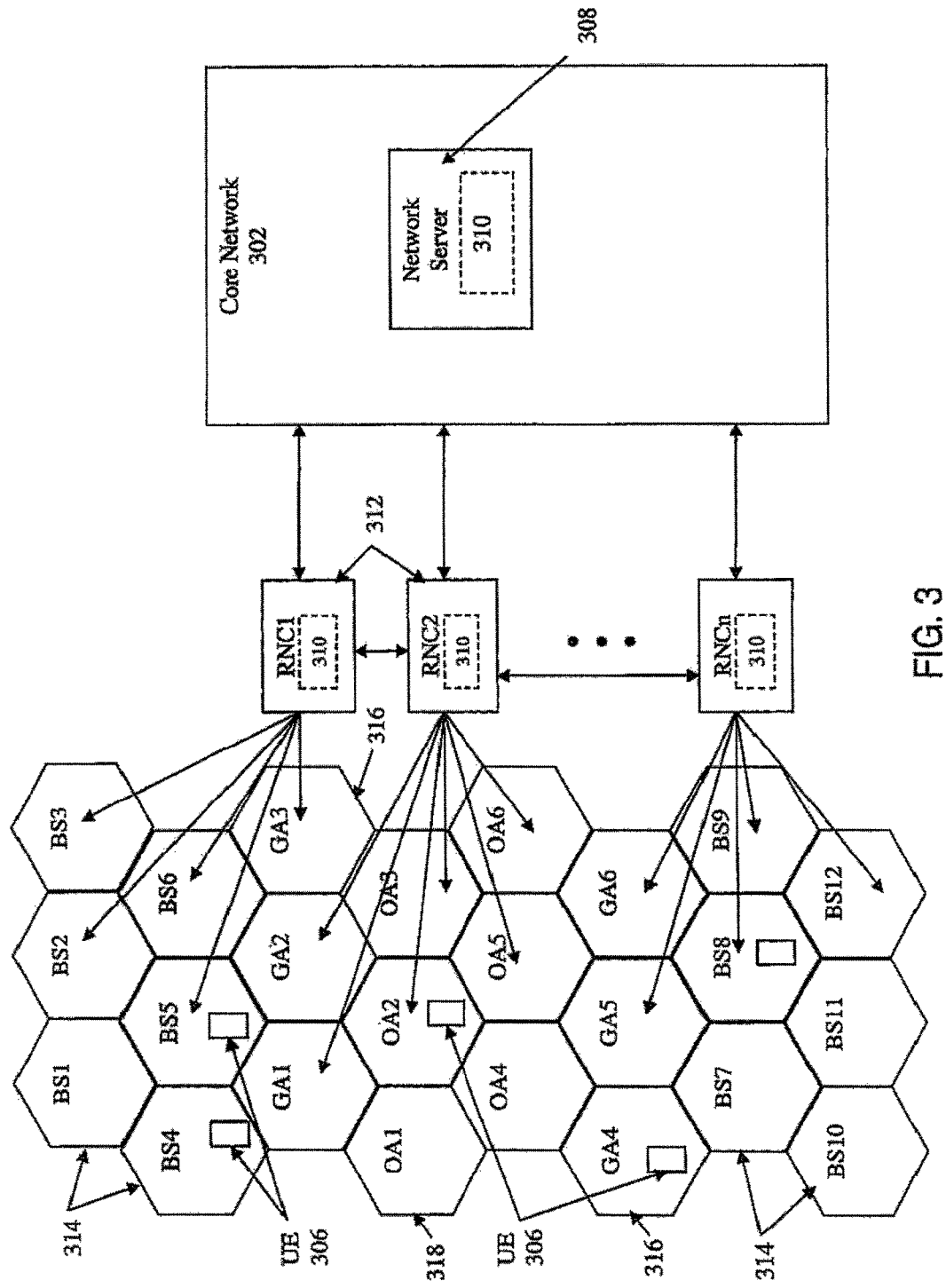
FIG. 3 is a system block diagram illustrating an exemplary dynamic MBSFN configuration system to enhance radio resource efficiency in accordance with an embodiment of the present invention.

FIG. 3 is a system block diagram illustrating an exemplary dynamic MBSFN configuration system to enhance radio resource efficiency in accordance with an embodiment of the present invention.

The exemplary system comprises a core network 302, multiple radio network subsystems (RNSs) 304 and multiple User Equipments (UEs) 306. The core network 302 includes a network server 308, configured to receive, store, process and route data from multiple data sources. The multiple data sources include, for example, a Public Switched Telephone Network (PSTN), wireless networks, wired networks including Wide Area Networks (WANs), Local Area Networks (LANs) and various other sources. The core network 302 and/or network server 308 may further include an MBSFN configuration application 310 to configure different MBSFN areas and to set guard areas between closely located MBSFN areas. Alternatively, the MBSFN application 310 is an MBSFN configuration module (not shown) that may be implemented in software and/or hardware and/or firmware and may be distributed in one or more devices in the system.

The multiple RNSs 304 comprise multiple radio network controllers (RNCs) 312 and multiple base stations 314. As an example, a first RNS 304 comprises RNC1 and base stations 314 BS1, BS2, BS3, BS4 and BS5. As another example, a second RNS 304 comprises RNC2 and base stations 314 BS6, BS7, BS8 and BS9. The RNCs 312 are coupled together to communicate between different RNSs 304. The MBSFN configuration application 310 may also be located on each of the RNCs 304 and may set and reconfigure different MBSFN areas. Alternatively, some functions of the MBSFN configuration application 310 may be performed in the core network 302 and/or the network server 308 and some functions of the MBSFN configuration application 310 may be performed in the RNCs 304.

Other base stations 314 include guard areas 316 GA1-GA6 and overlap areas 318 OA1-OA6. The MBSFN application 310 receives data from each of the RNCs 304 regarding cell parameters of each of the RNCs 304 base stations 314. When the MBSFN application 310 determines that a threshold has been exceeded, the MBSFN application 310 defines an absolute MBSFN configuration. The MBSFN application 310 receives threshold information regarding the number of UEs 306 in each of the cells (e.g., UEs 306 in BS4 and OA2), the number of idle guard radio resources in an old MBSFN (e.g., base stations 314 BS6, BS7, BS8 and BS9), the number of idle guard radio resources in an adjacent cell pool (e.g., a group of cells adjacent to but not in the new MBSFN area) to define the absolute MBSFN configuration. The MBSFN application 310 may be configured to perform at least the steps shown in FIG. 2 of the present disclosure.

As will be understood by those of skill in the art, the present invention may be embodied in other specific forms without departing from the essential characteristics thereof. For example, while some embodiments of the one dynamic MBSFN configuration method in consideration of radio resource efficiency and system thereof are depicted using a generic wireless network system, the method and system may be adapted to other network system embodiments or embodiments using other combinations of network systems and additional hardware therein.

Accordingly, the foregoing description is intended to be illustrative, but not limiting, of the scope of the invention which is set forth in the following claims and their equivalents.

What is claimed is:

1. A method of dynamic multicast-broadcast single frequency network (MBSFN) area configuration in consideration of radio resource efficiency comprising:
    determining a MBSFN configuration, the MBSFN configuration defining a number of users in a currently-defined MBSFN area and a number of idle guard radio resources in an previously-defined MBSFN area, wherein the MBSFN configuration defines upper and lower thresholds of cell pool parameters;
    calculating first saved radio resources by multiplying the number of users in the currently-defined MBSFN area by a first weight factor;
    calculating first wasted radio resources by multiplying the number of idle guard radio resources in the previously-defined MBSFN area by a second weight factor;
    selecting all cell pools adjacent to the currently-defined MBSFN area in which cell pool parameters of the adjacent cell pools exceed the lower threshold of cell pool parameters when the first saved radio resources are less than the first wasted radio resources;
    selecting an adjacent cell pool from the adjacent cell pools such that second saved resources subtracted by second wasted resources achieves a maximum value when the adjacent cell pool is added to the MBSFN configuration, wherein
        the second saved resources are calculated by adding the number of users in the currently-defined MBSFN area to a number of new users in cells of the adjacent cell pool and multiplying by a third weight factor, and
        the second wasted resources are calculated by adding the number of idle guard radio resources in the previously-defined MBSFN area to a number of idle guard radio resources in the cells of the adjacent cell pool and multiplying by a fourth weight factor; and
    setting the cells of the adjacent cell pool and the MBSFN configuration as a MBSFN final configuration.

2. The method of claim 1, wherein the MBSFN configuration is determined utilizing at least one of a number of users or a Signal-to-Interference Noise-Ratio (SINR).

3. The method of claim 1, wherein the second weight factor is calculated by multiplying a number of potential users in the idle guard radio resources in the previously-defined MBSFN area by a wasted radio resource weight factor.

4. The method of claim 3, wherein the first weight factor is substantially equal to the wasted radio resource weight factor.

5. The method of claim 1, wherein the cell pool parameters comprise at least one of a number of users and a Signal-to-Interference Noise-Ratio (SINR).

6. The method of claim 1, wherein the first weight factor is substantially equal to the third weight factor.

7. The method of claim 1, wherein the second weight factor is substantially equal to the fourth weight factor.

8. The method of claim 1, further comprising:
    selecting all MBSFN cell pools within the currently-defined MBSFN area in which cell pool parameters of the MBSFN cell pools are below the upper threshold of cell pool parameters when the cell pool parameters of the adjacent cell pools are below the lower threshold of cell pool parameters or when none of the adjacent cell pools are such that the second saved radio resources are less than the second wasted radio resources;

selecting an MBSFN cell pool from the MBSFN cell pools such that third saved resources subtracted by third wasted resources achieves a maximum value when the MBSFN cell pool is removed from the MBSFN configuration, wherein the third saved resources are calculated by subtracting the number of users in the currently-defined MBSFN area by a number of users in cells of the MBSFN cell pool and multiplying by a fifth weight factor, and the third wasted resources are calculated by subtracting the number of idle guard radio resources in the currently-defined MBSFN area by a number of idle guard radio resources in the cells of the MBSFN cell pool and multiplying by a sixth weight factor; and setting the cells of the MBSFN configuration minus the cells of the MBSFN cell pool as the MBSFN final configuration.

9. The method of claim 8, wherein the first weight factor is substantially equal to each of the third weight factor and the fifth weight factor.

10. The method of claim 8, wherein the second weight factor is substantially equal to each of the fourth weight factor and the sixth weight factor.

11. A dynamic Multicast-Broadcast Single Frequency Network (MBSFN) area configuration system for comparing saved radio resources with wasted radio resources to set a MBSFN final configuration, the system comprising:

a core network for receiving data from multiple data sources;

multiple radio network subsystems coupled to the core network, each of the radio network subsystems comprising multiple radio network controllers coupled to multiple base stations, the multiple base stations defining cells, wherein contiguous cells are grouped together to comprise an MBSFN area; and a number of user equipments (UEs) configured to receive MBSFN signals from the cells;

an MBSFN configuration module for defining a MBSFN configuration, the MBSFN configuration defining a number of UEs in a currently-defined MBSFN area, a number of added idle guard radio resources in an previously-defined MBSFN area and an upper and lower threshold of cell pool parameters, wherein the MBSFN configuration module for calculating first saved radio resources among the saved radio resources by multiplying a first weight factor by the number of UEs in the currently-defined MBSFN area, calculate first wasted radio resources among the wasted radio resources by multiplying a second weight factor by the number of idle guard radio resources added to the previously-defined MBSFN area, select all cell pools adjacent to the currently-defined MBSFN area in which cell pool parameters of the adjacent cell pools exceed the lower threshold of cell pool parameters when the first saved radio resources are less than the first wasted radio resources, select an adjacent cell pool from the adjacent cell pools such that second saved radio resources among the saved radio resources subtracted by second wasted radio resources among the wasted radio resources achieves a maximum value when the adjacent cell pool is added to the MBSFN configuration, wherein the second saved radio resources are calculated by adding the number of UEs in the currently-defined MBSFN area to a number of new UEs in cells of the adjacent cell pool and multiplying by a third weight factor, and the second wasted radio resources are calculated by adding the number of idle guard radio resources in the previously-defined MBSFN area to a number of idle guard radio resources in the cells of the adjacent cell pool and multiplying by a fourth weight factor; and set the cells of the adjacent cell pool and the MBSFN configuration as the MBSFN final configuration.

12. The dynamic MBSFN area configuration system of claim 11, wherein the MBSFN configuration is determined utilizing at least one of a number of users or a Signal-to-Interference Noise-Ratio (SINR).

13. The dynamic MBSFN area configuration system of claim 11, wherein the second weight factor is calculated by multiplying a number of potential users in the idle guard radio resources in the previously-defined MBSFN area by a wasted radio resource weight factor.

14. The dynamic MBSFN area configuration system of claim 13, wherein the first weight factor is substantially equal to the wasted radio resource weight factor.

15. The dynamic MBSFN area configuration system of claim 11, wherein the first weight factor is substantially equal to the third weight factor.

16. The dynamic MBSFN area configuration system of claim 11, wherein the second weight factor is substantially equal to the fourth weight factor.

17. The dynamic MBSFN area configuration system of claim 11, wherein the MBSFN configuration module is further configured to:

select all MBSFN cell pools within the currently-defined MBSFN area in which cell pool parameters of the MBSFN cell pools are below the upper threshold of cell pool parameters when the cell pool parameters of the adjacent cell pools are below the lower threshold of cell pool parameters or when none of the adjacent cell pools are such that the second saved radio resources are less than the second wasted radio resources;

select an MBSFN cell pool from the MBSFN cell pools such that third saved radio resources among the saved radio resources subtracted by third wasted radio resources among the wasted radio resources achieves a maximum value when the MBSFN cell pool is removed from the MBSFN configuration, wherein the third saved radio resources are calculated by subtracting the number of UEs in the currently-defined MBSFN area by a number of UEs in cells of the MBSFN cell pool and multiplying by a fifth weight factor, and the third wasted radio resources are calculated by subtracting the number of idle guard radio resources in the currently-defined MBSFN area by a number of idle guard radio resources in the cells of the MBSFN cell pool and multiplying by a sixth weight factor; and set the cells of the MBSFN configuration minus the cells of the MBSFN cell pool as the MBSFN final configuration.

18. The dynamic MBSFN area configuration system of claim 17, wherein the first weight factor is substantially equal to each of the third weight factor and the fifth weight factor.

19. The dynamic MBSFN area configuration system of claim 17, wherein the second weight factor is substantially equal to each of the fourth weight factor and the sixth weight factor.

* * * * *